2,781,243
PRODUCTION AND USE OF ACRYLONITRILE POLYMER SOLUTIONS

John Downing, Arthur Hodge, and James Gordon Napier Drewitt, Spondon, near Derby, England, assignors to British Celanese Limited, a corporation of Great Britain No Drawing. Application June 14, 1951, Serial No. 231,663

Claims priority, application Great Britain June 29, 1950

12 Claims. (Cl. 18—54)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are: substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. Polyacrylonitrile itself and such copolymers with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acrylonitrile polymers, especially such as are fibre-forming, can be dissolved in homogeneous solvent mixtures of nitromethane with carboxylic acids containing at least two carbon atoms and having a dissociation constant between $1 \times 10^{-4}$ and $2 \times 10^{-3}$ or, provided some water is present, between $2.25 \times 10^{-5}$ and $2 \times 10^{-3}$. Preferably the solvent mixtures contain 70–95% of nitromethane and, when the dissociation constant of the acid is between $2.25 \times 10^{-5}$ and $1 \times 10^{-4}$, also at least 3% of water and at least 2% of the acid. Solvent mixtures in which the acid has a dissociation constant between $1 \times 10^{-4}$ and $2 \times 10^{-3}$ may if desired also contain water. The amount of water in any of the solvent mixtures of the invention may for example be between 3% and 10%, but in no case should it be sufficient to destroy the homogeneity of the mixture.

The invention is of particular value in the formation and use of solutions of polyacrylonitrile itself, and of such copolymers of acrylonitrile and other unsaturated compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier or at least no more difficult to dissolve in the solvent mixtures of the invention than is polyacrylonitrile itself, and it will therefore be convenient in describing the invention in more detail to refer specifically to polyacrylonitrile.

The carboxylic acid which is employed in association with the nitromethane is preferably an aliphatic or aromatic mono- or di-carboxylic acid. One useful class of such acids comprises mono-substituted acetic acids having dissociation constants within the range specified, for example monochloracetic acid, glycollic acid and thioglycollic acid. Another class, which in general needs the addition of water, comprises succinic acid and its higher homologues, for example glutaric acid, and yet another comprises mono-substituted benzoic acids in which the substituent comprises at least one atom other than carbon, such for example as salicylic acid, p-hydroxybenzoic acid and phthalic acid.

The polyacrylonitrile may be dissolved, for example, by adding it to the required amount of the solvent mixture and heating preferably to about 80° C. or higher, for instance to 80°–90° C. Advantageously the solvent mixture containing the polyacrylonitrile may be boiled under reflux conditions. If desired however higher temperatures, e. g. up to 120°–130° C., may be used, the heating then being effected in a closed vessel; the use of such temperatures may be of advantage when a relatively concentrated solution, e. g. a 20–25% solution, of the polyacrylonitrile is to be made. Another method by means of which more rapid solution may often be achieved, is to add the polyacrylonitrile to substantially pure nitromethane, heat to a temperature above 80° C. and then mix in the required amount of the carboxylic acid, with water as may be desired or necessary. If desired the solvent mixture or the nitromethane (according to which method is adopted) may be heated near or to the temperature at which solution is to be effected before the polyacrylonitrile is added. The solutions once formed, especially solutions of concentration below 25%, and more particularly below 20%, can be cooled considerably without undergoing immediate gelling, though in some cases the cooled solutions may gel if left to stand for a fairly long time.

When the solutions are to be used for the production of one- or two-dimensional shaped articles, such as fibres or films, by extrusion or casting methods, it is preferable that the viscosity of the polyacrylonitrile or other acrylonitrile polymer (measured in 1% solution in dimethyl formamide at 20° C.) should be between about 2.5 and 4 centistokes, and especially between about 3 and 3.5 centistokes. The concentration of the solution is preferably between about 5% and 25%, and especially 7.5–20%, concentrations of 10%–20% being particularly useful.

The shaped articles are preferably made by a wet-spinning or wet-casting method, suitable coagulating liquids being carboxylic acid esters of boiling point above 250° C., in particular dialkyl phthalates, as described in U. S. application S. No. 257,198, filed November 19, 1951, now U. S. Patent 2,724,634, of J. Downing and J. G. N. Drewitt. The spinning solution and coagulating liquid may be at about room temperature, but it is usually better that the spinning solution should be at an elevated temperature, especially between about 60° or 70° C. and its boiling point, and that the coagulating liquid should be at a temperature within about the same range.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example wet-spun fibres, after leaving the coagulating bath, may be wound up and washed (e. g. in the form of multi-filament yarns), and then stretched while heated; for example they may be stretched in hot air, wet steam, or water at a temperature above 80° C. as described in British Patent 636,476, or while they are passed in contact with a hot metal surface, e. g. the surface of a plate or roller kept at about 120°–150° C. To obtain a yarn of the highest tenacity it is advantageous to stretch the fibres as soon as possible after coagulation is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn before it is heated and stretched, or by carrying out the stretching operation in an aqueous oil emulsion at an elevated temperature, especially at a temperature above 80° C., as described in British Patent 636,476. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional articles by extrusion or casting methods, they may also be employed for other purposes, e. g. for the production of coatings of acrylonitrile polymers.

The following example illustrates the invention.

Example

Polyacrylonitrile having a viscosity (in 1% dimethyl formamide solution at 20° C.) of 3.4 centistokes, and made by polymerising acrylonitrile in an aqueous medium using ammonium persulphate as catalyst, was boiled under reflux conditions with a number of mixtures comprising nitromethane and an organic acid, as indicated in the table below. In each case a clear homogeneous solution was obtained, which could be cooled considerably without immediate gelling, and from which fibres of good properties could be made by extruding the solution at 90° C. into dibutyl phthalate at the same temperature, and orienting and relaxing in known manner the fibres initially formed.

| Solvent components: | Ratio by weight |
|---|---|
| Nitromethane/monochloracetic acid | 80:20 |
| Nitromethane/thioglycollic acid | 85:15 |
| Nitromethane/glycollic acid | 80:20 |
| Nitromethane/salicylic acid/water | 80:15:5 |
| Nitromethane/phthalic acid/water | 80:15:5 |
| Nitromethane/p-hydroxy-benzoic acid/water | 82:12:6 |
| Nitromethane/succinic acid/water | 84:9:7 |
| Nitromethane/monochloracetic acid/water | 80:15:5 |
| Nitromethane/thioglycollic acid/water | 83:12:5 |
| Nitromethane/glycollic acid/water | 80:15:5 |

Having described our invention, what we desire to secure by Letters Patent is:

1. Compositions comprising an acrylonitrile polymer containing in the polymer molecule above 50% by weight of acrylonitrile dissolved in a solvent mixture of nitromethane and a mono-substituted acetic acid selected from the group which consists of monochloroacetic acid, glycollic acid and thioglycollic acid, containing 70–95% by weight of nitromethane.

2. Compositions according to claim 1, wherein the polymer is polyacrylonitrile.

3. Compositions according to claim 1, wherein the polymer is a copolymer of acrylonitrile with another monovinyl compound.

4. Compositions according to claim 1, wherein the viscosity of the polymer measured in 1% solution in dimethylformamide at 20° C. is 2.5–4 centistokes and the concentration of the polymer in the composition is 7.5–20% by weight.

5. Compositions according to claim 2, wherein the viscosity of the polymer measured in 1% solution in dimethylformamide at 20° C. is 2.5–4 centistokes and the concentration of the polymer in the composition is 7.5–20% by weight.

6. Compositions according to claim 3, wherein the viscosity of the polymer measured in 1% solution in dimethylformamide at 20° C. is 2.5–4 centistokes and the concentration of the polymer in the composition is 7.5–20% by weight.

7. Process for the production of a solution of an acrylonitrile polymer containing in the polymer molecule above 50% by weight of acrylonitrile, which comprises maintaining the polymer in contact with a solvent mixture at a temperature above 80° C. until a clear homogeneous solution has been formed, the solvent mixture being a mixture of nitromethane and a mono-substituted acetic acid selected from the group which consists of monochloroacetic acid, glycollic acid and thioglycollic acid, containing 70–95% by weight of nitromethane.

8. Process according to claim 7, wherein the polymer is a polyacrylonitrile having a viscosity in 1% solution in dimethylformamide at 20° C. of 2.5–4 centistokes.

9. Process according to claim 7, wherein the polymer is a copolymer of acrylonitrile with another monovinyl compound and has a viscosity in 1% solution in dimethylformamide at 20° C. of 2.5–4 centistokes.

10. Process for the production of fibres and films and other one- and two-dimensional shaped articles, which comprises shaping a composition claimed in claim 1, and setting the shaped composition by means of a liquid coagulating agent.

11. Process according to claim 10, wherein the shaped composition is set by means of an aromatic hydrocarbon coagulating liquid.

12. Process according to claim 10, wherein the composition being shaped and the coagulating liquid are both at a temperature above 70° C.

References Cited in the file of this patent

UNITED STATES PATENTS

| 2,210,771 | Myles et al. | Aug. 6, 1940 |
| 2,436,204 | D'Alelio | Feb. 17, 1948 |
| 2,515,206 | Finzel et al. | July 18, 1950 |
| 2,588,335 | Dalton | Mar. 11, 1952 |
| 2,658,879 | Beaman | Nov. 10, 1953 |

FOREIGN PATENTS

| 652,012 | Great Britain | Apr. 11, 1951 |

OTHER REFERENCES

Kolthoff et al.: Textbook of Quantitative Analysis, page 38, published by Macmillan Co., N. Y., 1943.